March 9, 1965 N. NADOLSKY 3,173,029
VOLTAGE SURGE AND MODULATION LIMITER
Filed Oct. 2, 1961
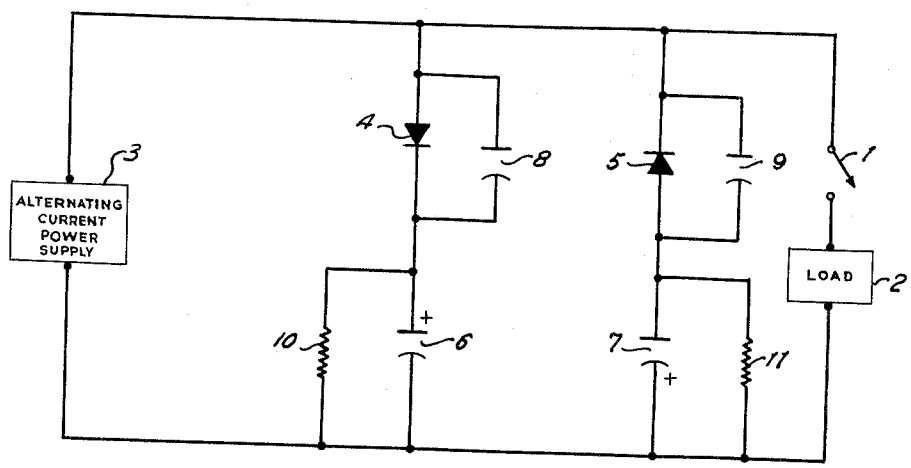
INVENTOR
Nicolas Nadolsky
BY Arthur M. Sloan
ATTORNEY

United States Patent Office 3,173,029
Patented Mar. 9, 1965

3,173,029
VOLTAGE SURGE AND MODULATION LIMITER
Nicolas Nadolsky, Garland, Tex., assignor to
Varo, Inc.
Filed Oct. 2, 1961, Ser. No. 142,416
3 Claims. (Cl. 307—93)

The present invention relates to a voltage surge and modulation suppressor or limiter for use in an electrical or electronic circuit.

Voltage surge and modulation suppressors and limiters heretofore used have not been very efficient. Furthermore, they have not been susceptible of use at high power levels without damage.

Accordingly, it is an object of this invention to provide a voltage surge and modulation limiter or suppressor for use in an electrical or electronic circuit.

Another object of this invention is to provide a voltage surge and modulation limiter or suppressor which is more efficient than presently used devices.

Still another object of the invention is to provide a voltage surge and modulation limiter or suppressor wherein the limiting is directly proportional to the voltage overshoot.

A further object of the invention is to provide a voltage surge and modulation limiter or suppressor having a low impedance circuit.

A still further object of this invention is to provide a voltage surge and modulation limiter or suppressor which can be used at high power levels without damage, since instantaneous heating effects are at a minimum.

Yet another object of the invention is to provide a voltage surge and modulation limiter or suppressor which integrates the change in circuit conditions.

Further objects of this invention will be apparent to those skilled in the art from consideration of the following description taken in connection with the accompanying drawing.

The drawing is a schematic of the basic voltage surge and modulation limiter.

The voltage surge and modulation limiter is an overvoltage limiter or suppressor to prevent overvoltage in the output resulting from removal of the load. This is effective, if there is a regulation circuit, during the period prior to the regulation circuit's taking effect. Also the voltage surge and modulation limiter takes care of any transit condition causing an overshoot in the output voltage whether such condition is due to an increase in the input voltage or removal of the load. In addition, the voltage surge and modulation limiter reduces modulation effects on the output voltage.

Referring to the drawing, the invention may be better understood by going through a cycle of operation.

When the switch 1 is closed and the load 2 is in the circuit with the alternating current power supply 3 supplying alternating current, there is no overvoltage problem. Upon opening the switch 1, and thus removing load 2 from the circuit, an overvoltage occurs.

The overvoltage is handled in the following manner. Diode or rectifier 4 passes only the positive portion of the alternating current, and diode or rectifier 5 passes only the negative portion of the alternating current. After this rectification, low impedance electrolytic capacitors 6 and 7 are charged to build up the direct current level during the first few cycles of operation. Electrolytic capacitors 6 and 7 are almost a short circuit to any change in voltage level.

Capacitors 8 and 9 are in the circuit for purposes of RF suppression.

Resistors 10 and 11 are discharge resistors.

The overvoltage is limited by the charging of capacitors 6 and 7. After the capacitors 6 and 7 are charged to build up the direct current level during the first few cycles of operation, the modulaton effects on the output voltage are reduced.

In place of capacitor 6, a number of capacitors of the same total value may be substituted in series with diode or rectifier 4. Such capacitors are positioned in parallel with each other.

Likewise, in place of capacitor 7, a number of capacitors of the same total value may be substituted in series with diode or rectifier 5. Such capacitors are positioned in parallel with each other.

The surge limiter may be likened to an energy storage tank. Determination of the values of capacitors 6 and 7 may be made by using the formula $E=\frac{1}{2}CV^2$ watt seconds where E is energy, C is the value of the capacitor, and V is the voltage.

In determining the value of resistors 10 and 11, the formula $R \times C =$ seconds may be used where R is the value of the resistor and C is the value of the capacitor.

While I have shown a particular embodiment of my invention, it will, of course, be understood that I do not wish to be limited thereto since many modifications in the circuit arrangement and the structure may be made, and I contemplate by the appended claims to cover all such modifications as fall within the true spirit and scope of my invention.

What is claimed is:

1. A voltage surge and modulation limiter for use with an alternating current power supply comprising a first diode, a first capacitor in series with the first diode, a second diode, a second capacitor in series with the second diode, the first diode and the first capacitor being connected in parallel with the second diode and second capacitor, the first diode connected so as to conduct in one direction while the second diode conducts in the other direction, two discharge resistors, one discharge resistor in parallel with the first capacitor and the other discharge resistor in parallel with the second capacitor, and two capacitors for RF suppression, one RF suppression capacitor in parallel with the first diode and the other RF suppression capacitor in parallel with the second diode.

2. A voltage surge and modulation limiter comprising an alternating current source, two diodes connected in the circuit so that when one diode is conducting in one direction, the other diode is conducting in the other direction, one diode having its anode electrode connected to the cathode electrode of the other diode, a first means of capacitance connected in series with the anode electrode of one diode, a second means of capacitance connected in series with the cathode electrode of the other diode, the first and second means of capacitance having interconnected leads, two discharge resistors, one of the discharge resistors in parallel with the first means of capacitance and the other discharge resistor in parallel with the second means of capacitance, two capacitors for RF suppression, one RF suppressor capacitor in parallel with one diode and the other RF suppressor capacitor in parallel with the other diode, a load, and a means of removing the load from the circuit.

3. A voltage surge and modulation limiter comprising an alternating current source, a first diode, a first means of capacitance in series with the first diode, a second diode, a second means of capacitance in series with the second diode, the first diode and the first means of capacitance being connected in parallel with the alternating current source, the first diode and the first means of capacitance also being connected in parallel with the second diode and the second means of capacitance, the first diode connected so as to conduct in one direction while the second diode conducts in the other direction, a resistor in parallel with the first means of capacitance, a resistor in parallel with the second means of capacitance, two capacitors for RF suppression, one RF suppression capacitor in parallel with the first diode and the other RF suppression capacitor in parallel with the second diode, a load connected in parallel with the second diode and the second means of capacitance, and a means of removing the load from the circuit.

References Cited by the Examiner

UNITED STATES PATENTS

| | | | |
|---|---|---|---|
| 2,916,618 | 12/59 | Adams et al. | 307—88.5 |
| 3,020,420 | 2/62 | Smee | 307—88.5 |

FOREIGN PATENTS

| | | |
|---|---|---|
| 210,016 | 7/60 | Austria. |
| 875,316 | 8/61 | Great Britain. |

LLOYD McCOLLUM, *Primary Examiner.*

ROBERT L. SIMS, *Examiner.*